(12) United States Patent
Hsu et al.

(10) Patent No.: US 12,382,478 B2
(45) Date of Patent: Aug. 5, 2025

(54) WIRELESS FIDELITY DEVICE WITH DYNAMIC CAPABILITY ALLOCATION AND RELATED CAPABILITY ALLOCATION METHOD

(71) Applicant: MEDIATEK INC., Hsin-Chu (TW)

(72) Inventors: Chien-Fang Hsu, Hsinchu (TW); Shen-Po Lin, Hsinchu (TW); Yongho Seok, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 362 days.

(21) Appl. No.: 17/717,151

(22) Filed: Apr. 11, 2022

(65) Prior Publication Data

US 2022/0330225 A1 Oct. 13, 2022

Related U.S. Application Data

(60) Provisional application No. 63/178,641, filed on Apr. 23, 2021, provisional application No. 63/173,539, filed on Apr. 12, 2021.

(51) Int. Cl.
*H04W 72/04* (2023.01)
*H04W 72/044* (2023.01)
(Continued)

(52) U.S. Cl.
CPC ......... *H04W 72/51* (2023.01); *H04W 72/044* (2013.01); *H04W 72/20* (2023.01);
(Continued)

(58) Field of Classification Search
CPC ... H04W 72/51; H04W 72/044; H04W 72/20; H04W 76/14; H04W 76/15; H04W 84/12;
(Continued)

(56) References Cited

U.S. PATENT DOCUMENTS 10,959,153 B2 * 3/2021 Patil ..................... H04W 72/00
11,963,046 B2 * 4/2024 Wu ......................... H04W 8/02
(Continued)

FOREIGN PATENT DOCUMENTS

| CN | 110167201 | 8/2019 | |
|---|---|---|---|
| WO | 2021/049817 A1 | 3/2021 | |
| WO | WO-2022134945 A1 * | 6/2022 | ............ H04W 28/02 |

OTHER PUBLICATIONS

Yonggang Fang et al. (ZTE), "Multi-Link Setup Discussion", IEEE 802.11-2020/1187, pp. 1-14, Aug. 14, 2020.
(Continued)

*Primary Examiner* — Jay P Patel
(74) *Attorney, Agent, or Firm* — Winston Hsu (57) ABSTRACT

A capability allocation method employed by a wireless fidelity (Wi-Fi) device includes: during association between the Wi-Fi device and another Wi-Fi device, setting up a first capability allocation of a first non-AP station (STA); and after the first non-AP STA associates with a first AP, changing the first capability allocation of the first non-AP STA in the absence of re-association. Each of the Wi-Fi device and the another Wi-Fi device includes a plurality of stations. The first AP is affiliated to the another Wi-Fi device. The first non-AP STA is affiliated to the Wi-Fi device.

18 Claims, 10 Drawing Sheets

(51) Int. Cl.
*H04W 72/20* (2023.01)
*H04W 72/51* (2023.01)
*H04W 76/14* (2018.01)
*H04W 76/15* (2018.01)
*H04W 84/12* (2009.01)

(52) U.S. Cl.
CPC ............ *H04W 76/14* (2018.02); *H04W 76/15* (2018.02); *H04W 84/12* (2013.01)

(58) Field of Classification Search
CPC .. H04W 8/22; H04W 28/065; H04W 72/0453
See application file for complete search history.

(56) References Cited

U.S. PATENT DOCUMENTS

| | | | | |
|---|---|---|---|---|
| 12,058,753 | B2* | 8/2024 | Jang | H04W 76/15 |
| 12,120,760 | B2* | 10/2024 | Chu | H04W 76/15 |
| 2016/0337230 | A1 | 11/2016 | Emmanuel | |
| 2019/0082373 | A1* | 3/2019 | Patil | H04L 1/1614 |
| 2020/0221545 | A1* | 7/2020 | Stacey | H04W 84/12 |
| 2021/0007168 | A1* | 1/2021 | Asterjadhi | H04W 52/0216 |
| 2021/0014911 | A1* | 1/2021 | Patil | H04W 76/15 |
| 2021/0029766 | A1 | 1/2021 | Zhang | |
| 2021/0144787 | A1* | 5/2021 | Kwon | H04W 76/15 |
| 2021/0259033 | A1* | 8/2021 | Kim | H04W 76/11 |
| 2021/0274500 | A1* | 9/2021 | Cariou | H04W 48/08 |
| 2021/0314846 | A1* | 10/2021 | Chu | H04W 40/244 |
| 2021/0329500 | A1* | 10/2021 | Cariou | H04W 74/002 |
| 2021/0337613 | A1* | 10/2021 | Seok | H04W 76/15 |
| 2021/0360521 | A1* | 11/2021 | Seok | H04W 52/0203 |
| 2021/0368322 | A1* | 11/2021 | Seok | H04W 12/041 |
| 2021/0392571 | A1* | 12/2021 | Kneckt | H04W 48/10 |
| 2022/0124855 | A1* | 4/2022 | Hu | H04W 76/34 |
| 2022/0132608 | A1* | 4/2022 | Chu | H04W 76/15 |
| 2022/0287122 | A1* | 9/2022 | Wang | H04W 8/22 |
| 2022/0346165 | A1* | 10/2022 | Hsu | H04W 8/24 |
| 2023/0103810 | A1* | 4/2023 | Kim | H04W 36/00692 370/329 |
| 2023/0147636 | A1* | 5/2023 | Kim | H04W 76/15 370/318 |
| 2023/0164859 | A1* | 5/2023 | Jang | H04W 76/11 370/328 |
| 2023/0345349 | A1* | 10/2023 | Kim | H04W 76/15 |
| 2023/0403647 | A1* | 12/2023 | Kim | H04W 52/02 |
| 2024/0015564 | A1* | 1/2024 | Park | H04W 28/12 |
| 2024/0040639 | A1* | 2/2024 | Chitrakar | H04W 76/12 |
| 2024/0073952 | A1* | 2/2024 | Kim | H04W 76/15 |

OTHER PUBLICATIONS

Li et al., "Proposed Draft Text for MLO Multi-Link Channel Access: Capability Signaling", IEEE 802.11-21/0373r6, Mar. 4, 2021, pp. 1-6.

* cited by examiner

WIRELESS FIDELITY DEVICE WITH DYNAMIC CAPABILITY ALLOCATION AND RELATED CAPABILITY ALLOCATION METHOD

CROSS REFERENCE TO RELATED APPLICATIONS

This application claims the benefit of U.S. Provisional Application No. 63/173,539, filed on Apr. 12, 2021. Further, this application claims the benefit of U.S. Provisional Application No. 63/178,641, filed on Apr. 23, 2021. The contents of these applications are incorporated herein by reference.

BACKGROUND

The present invention relates to wireless communications, and more particularly, to a wireless fidelity (Wi-Fi) device with dynamic capability allocation and a related capability allocation method.

In a Wi-Fi multi-link operation (MLO), there may exist several links between two multi-link devices (MLDs), including one access point (AP) MLD and one non-AP MLD. These links can operate independently to increase the overall throughput and/or to improve the connection stability. The AP MLD may be regarded as having multiple APs affiliated to the same MLD. The non-AP MLD may be regarded as having multiple non-AP stations (STAs) affiliated to the same MLD. More specifically, each of the AP MLD and the non-AP MLD may include a plurality of stations, where each station affiliated to the same AP MLD is an AP, and each station affiliated to the same non-AP MLD is a non-AP STA. The APs or non-AP STAs in the same MLD may share some resources, such as memories, antennas, and/or radios. In addition, the MLD can manage the allocation of such resources. The capability allocations set up by the non-AP MLD are not necessarily the same as the capability allocations set up by the AP MLD. It is possible that the number of enabled links between one non-AP MLD and one AP MLD changes after capability allocations of the non-AP MLD and capability allocations of the AP MLD are set up.

In a dual band dual concurrent (DBDC) host or a triple band triple concurrent (TBTC) host, several devices (stations) may operate independently. Regarding an AP DBDC/TBTC host, each of the affiliated devices (stations) is an AP. Regarding an STA DBDC/TBTC host, each of the affiliated devices (stations) is a non-AP STA. The APs or non-STAs in the same DBDC/TBTC host may share some resources, such as memories, antennas, and/or radios. In addition, the DBDC/TBTC host can manage the allocation of such resources. The capability allocations set up by the STA DBDC/TBTC host are not necessarily the same as the capability allocations set up by the AP DBDC/TBTC host. It is possible that the number of links between one STA DBDC/TBTC host and one AP DBDC/TBTC host changes after capability allocations of the STA DBDC/TBTC host and capability allocations of the AP DBDC/TBTC host are set up.

Thus, there is a need for an innovative dynamic capability allocation scheme for updating capability allocation(s) set up in one Wi-Fi device (e.g. non-AP MLD or STA DBDC/TBTC host) for affiliated non-AP STA(s).

SUMMARY

One of the objectives of the claimed invention is to provide a wireless fidelity (Wi-Fi) device with dynamic capability allocation and a related capability allocation method.

According to a first aspect of the present invention, an exemplary capability allocation method employed by a wireless fidelity (Wi-Fi) device is disclosed. The exemplary capability allocation method includes: during association between the Wi-Fi device and another Wi-Fi device, setting up a first capability allocation of a first non-AP station (STA); and after the first non-AP STA associates with a first AP, changing the first capability allocation of the first non-AP STA in the absence of re-association. Each of the Wi-Fi device and the another Wi-Fi device comprises a plurality of stations. Each station affiliated to the another Wi-Fi device is an access point (AP). Each station affiliated to the Wi-Fi device is a non-AP station (STA). The first AP is affiliated to the another Wi-Fi device, and the first non-AP STA is affiliated to the Wi-Fi device.

According to a second aspect of the present invention, an exemplary wireless fidelity (Wi-Fi) device is disclosed. The exemplary Wi-Fi device comprises a plurality of affiliated stations, including a first affiliated station. During association between the Wi-Fi device and another Wi-Fi device, the Wi-Fi device sets up a first capability allocation of the first affiliated station. Each station affiliated to the another Wi-Fi device is an access point (AP). Each station affiliated to the Wi-Fi device is a non-AP station (STA). After the first affiliated station associates with a second affiliated station included in a plurality of affiliated stations of said another Wi-Fi device, the Wi-Fi device changes the first capability allocation of the first affiliated Wi-Fi device in the absence of re-association.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
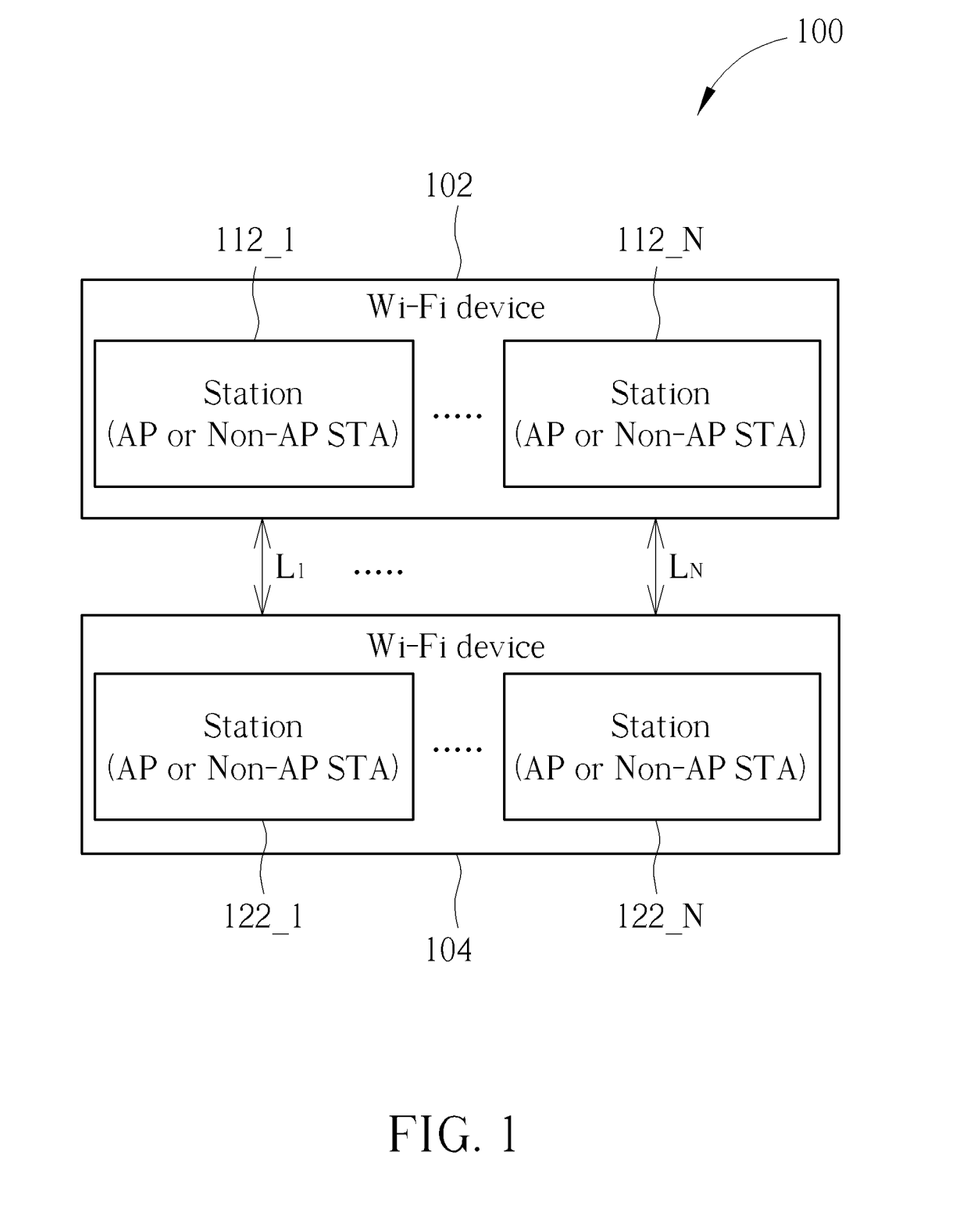
FIG. 1 is a diagram illustrating a wireless fidelity (Wi-Fi) system according to an embodiment of the present invention.

FIG. 1 is a diagram illustrating a wireless fidelity (Wi-Fi) system according to an embodiment of the present invention. The Wi-Fi system 100 has a plurality of Wi-Fi devices 102 and 104. By way of example, but not limitation, the Wi-Fi devices 102 and 104 may be in compliance with IEEE 802.11ax standard or IEEE 802.11be standard. For brevity and simplicity, only two Wi-Fi devices are shown in FIG. 1. In practice, the Wi-Fi system 100 is allowed to have more than two Wi-Fi devices. As shown in FIG. 1, the Wi-Fi device 102 includes a plurality of stations 112_1-112_N, where N is a positive integer not smaller than 2. Like the Wi-Fi device 102, Wi-Fi device 104 includes a plurality of stations 122_1-122_N. The Wi-Fi device 102 is capable of communicating with the Wi-Fi device 104 via a plurality of links $L_1$-$L_N$. For example, the links $L_1$-$L_N$ may be channels at different radio-frequency (RF) bands such as 2.4 GHz band, 5 GHz band and 6 GHz band. In addition, a station 112_i of Wi-Fi device 102 may communicate with a station 122_i of Wi-Fi device 104 via a link $L_i$ established though an association process, where i={1, . . . , N}. Each of the stations 112_1-112_N may be an access point (AP) or a non-AP station (STA), depending upon the actual role played by the Wi-Fi device 102. Similarly, each of the stations 122_1-122_N may be an AP or a non-AP STA, depending upon the actual role played by the Wi-Fi device 104.

In one exemplary implementation, both of the Wi-Fi devices 102 and 104 may be dual band dual concurrent (DBDC) hosts or triple band triple concurrent (TBTC) hosts. In a case where the Wi-Fi device 102 is an AP DBDC/TBTC host and the Wi-Fi device 104 is an STA DBDC/TBTC host, the stations 112_1-112_N affiliated to the same Wi-Fi device 102 are all APs, and the stations 122_1-122_N affiliated to the same Wi-Fi device 104 are all non-AP STAs. In another case where the Wi-Fi device 102 is an STA DBDC/TBTC host and the Wi-Fi device 104 is an AP DBDC/TBTC host, the stations 112_1-112_N affiliated to the same Wi-Fi device 102 are all non-AP STAs, and the stations 122_1-122_N affiliated to the same Wi-Fi device 104 are all APs. One individual association is performed between the station 112_1 of the Wi-Fi device 102 and the station 122_1 of the Wi-Fi device 104, another individual association is performed between the station 112_2 of the Wi-Fi device 102 and the station 122_2 of the Wi-Fi device 104, and so on.

In another exemplary implementation, both of the Wi-Fi devices 102 and 104 may be multi-link devices (MLDs). In a case where the Wi-Fi device 102 is an AP MLD and the Wi-Fi device 104 is a non-AP MLD, the stations 112_1-112_N affiliated to the same Wi-Fi device 102 are all APs, and the stations 122_1-122_N affiliated to the same Wi-Fi device 104 are all non-AP STAs. In another case where the Wi-Fi device 102 is a non-AP MLD and the Wi-Fi device 104 is an AP MLD, the stations 112_1-112_N affiliated to the same Wi-Fi device 102 are all non-AP STAs, and the stations 122_1-122_N affiliated to the same Wi-Fi device 104 are all APs. One MLD-level association (i.e. MLO association) is performed between the Wi-Fi devices 102 and 104.

One of the Wi-Fi devices 102 and 104 (e.g. non-AP MLD or STA DBDC/TBTC host) may employ the proposed dynamic capability allocation scheme for updating capability allocation(s) of affiliated device(s) (e.g. non-AP STA(s)) in the Wi-Fi device. In accordance with the proposed dynamic capability allocation scheme, changing a capability allocation of a non-AP STA in the Wi-Fi device (e.g. non-AP MLD or STA DBDC/TBTC host) is performed after the non-AP STA associates with an AP of another Wi-Fi device (e.g. AP MLD or AP DBDC/TBTC host) through an association process, and changing the capability allocation of the non-AP STA in the Wi-Fi device (e.g. non-AP MLD or STA DBDC/TBTC host) is achieved in the absence of re-association (e.g. re-association between MLDs or re-association between an AP of an AP DBDC/TBTC host and a non-AP STA of an STA DBDC/TBTC host). Since re-association may interrupt current traffic and the period to do re-association may be very long, the proposed dynamic capability allocation scheme sends a frame to carry information about a different capability allocation used for updating the capability allocation of the non-AP STA in the Wi-Fi device. Further details of the proposed dynamic capability allocation scheme are described as below with reference to the accompanying drawings.

Multiple links can share hardware resources of the same Wi-Fi device 102/104. Taking a memory as an example of the shared resource, there exists a maximum memory bound to support frame exchange. However, due to cost, it is not always possible to allocate each link with a memory size matching the maximum memory bound. Moreover, for certain usage scenarios, it is not always necessary to enable all the bands or all the links. For example, some links may be disabled when the load is low. Thus, allocating these resources possessed by the Wi-Fi device dynamically is important to accommodate different usage scenarios for maximizing the efficiency or the throughput. For better comprehension of technical features of the present invention, the following assumes that a capability allocation set up in a Wi-Fi device (e.g. non-AP MLD or STA DBDC/TBTC host) for a non-AP STA may include a memory resource allocation. For example, the memory resource allocation of the non-AP STA may include a maximum media access control (MAC) protocol data unit (MPDU) length. The maximum MPDU length in the very high throughput (VHT)/high efficiency (HE) capabilities element has defined 3 possible values. Specifically, a value of a 2-bit maximum MPDU length subfield is set to 0 for 3895 (4K) octets, set to 1 for 7991 (8K) octets, and set to 2 for 11454 (11K) octets.

Figure 2:
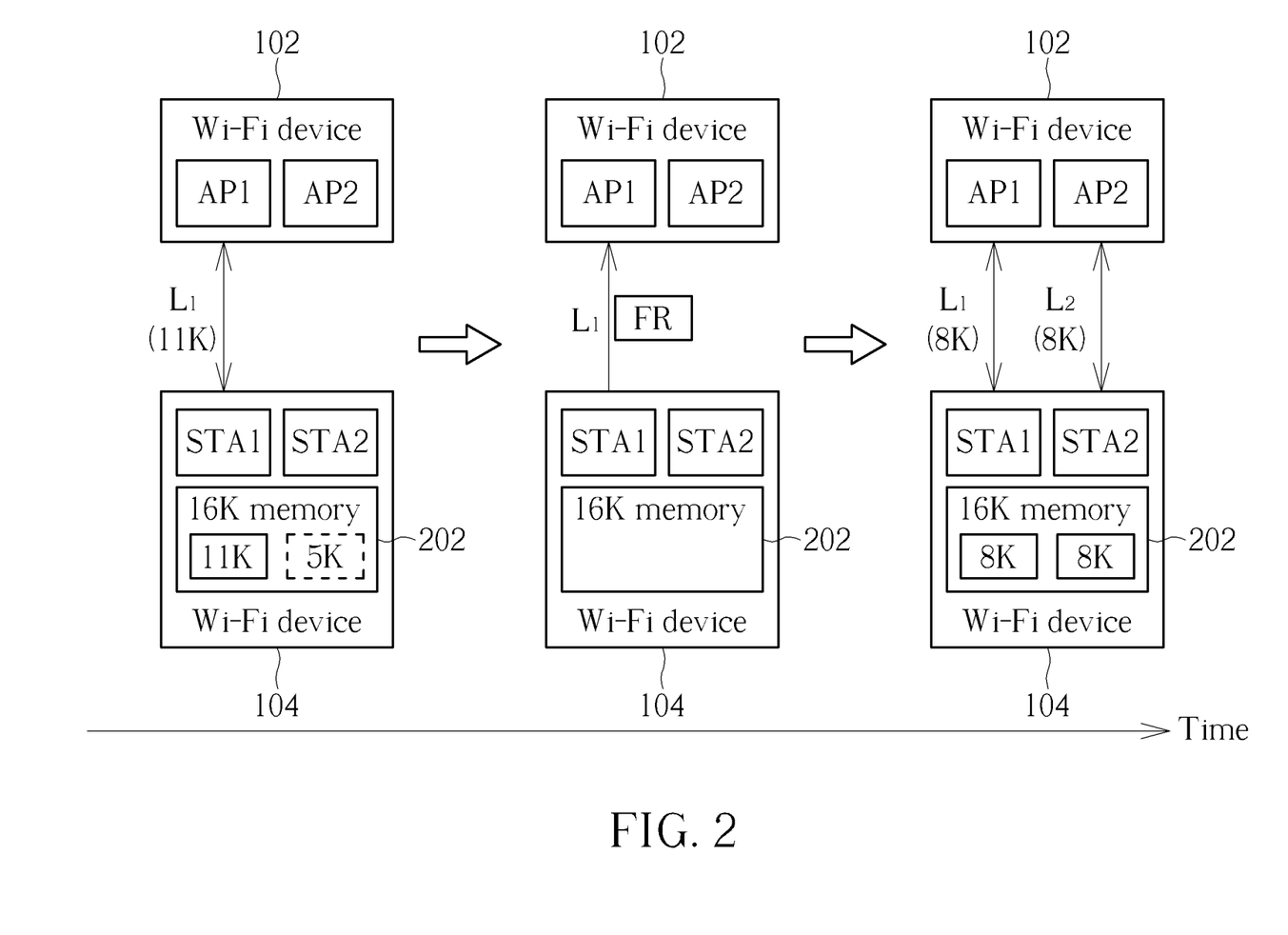
FIG. 2 is a diagram illustrating a first DBDC scenario according to an embodiment of the present invention.

FIG. 2 is a diagram illustrating a first DBDC scenario according to an embodiment of the present invention. Suppose that the Wi-Fi device 102 is an AP DBDC host that has two stations 112_1 and 112_N (N=2) being APs (labeled by AP1 and AP2), the Wi-Fi device 104 is an STA DBDC host that has a 16K memory 202 and two stations 122_1 and 122_N (N=2) being non-AP STAs (labeled by STA1 and STA2), and the links $L_1$ and $L_2$ are at different bands (e.g. 2.4 GHz band and 5 GHz band). Initially, only the non-AP station STA1 associates with the access point AP1, and the capability allocation (e.g. maximum MPDU length) set up in the Wi-Fi device 104 for the non-AP station STA1 is 11454 (11K) octets. Based on the capability signaled from the Wi-Fi device 104, the access point AP1 may send a packet with an MPDU length constrained by a maximum MPDU length=11454 (11K) octets to the non-AP station STA1 via the link $L_1$ (i.e. the MPDU length of the packet is equal to or smaller than the maximum MPDU length=11454 (11K) octets if the AP MLD 104 sends the packet).

In this example, the association between the non-AP station STA2 and the access point AP2 is initiated after the non-AP station STA1 already associates with the access point AP1. Hence, in response to the association between the non-AP station STA2 and the access point AP2, the non-AP station STA1 sends a frame FR to the access point AP1 for signaling the capability allocation update of the non-AP station STA1. For example, the frame FR can be sent after the non-AP station STA2 successfully associates with the access point AP2. For another example, the frame FR can be sent before the non-AP station STA2 initiates the association with the access point AP2.

To balance the load and maximize the possible throughput, the Wi-Fi device (e.g. STA DBDC host) 104 with the 16K memory 202 may evenly divide the memory resource and allocate the same capability (e.g. maximum MPDU length=7991 (8K) octets) to both of the non-AP stations STA1 and STA2. Hence, during the association between the non-AP station STA2 and the access point AP2, the non-AP station STA2 sets up a capability allocation (e.g. maximum MPDU length) by 7991 (8K) octets, and announces its capability allocation. The frame FR sent from the non-AP station STA1 carries information about a different capability allocation (e.g. maximum MPDU length=7991 (8K) octets) used for updating the current capability allocation (e.g. maximum MPDU length=11454 (11K) octets) of the non-AP station STA1. It should be noted that no re-association between the non-AP station STA1 and the access point AP1 is required for changing/updating the current capability allocation of the non-AP station STA1.

As shown in FIG. 2, after the non-AP station STA2 associates with the access point AP2, the 16K memory 202 is shared by both non-AP stations STA1 and STA2. Based on the capability signaled from the Wi-Fi device 104, the access point AP1 may send a packet with an MPDU length constrained by a maximum MPDU length=7991 (8K) octets to the non-AP station STA1 via the link $L_1$, and the access point AP2 may send a packet with an MPDU length constrained by the maximum MPDU length=7991 (8K) octets to the non-AP station STA2 via the link $L_2$.

Figure 3:
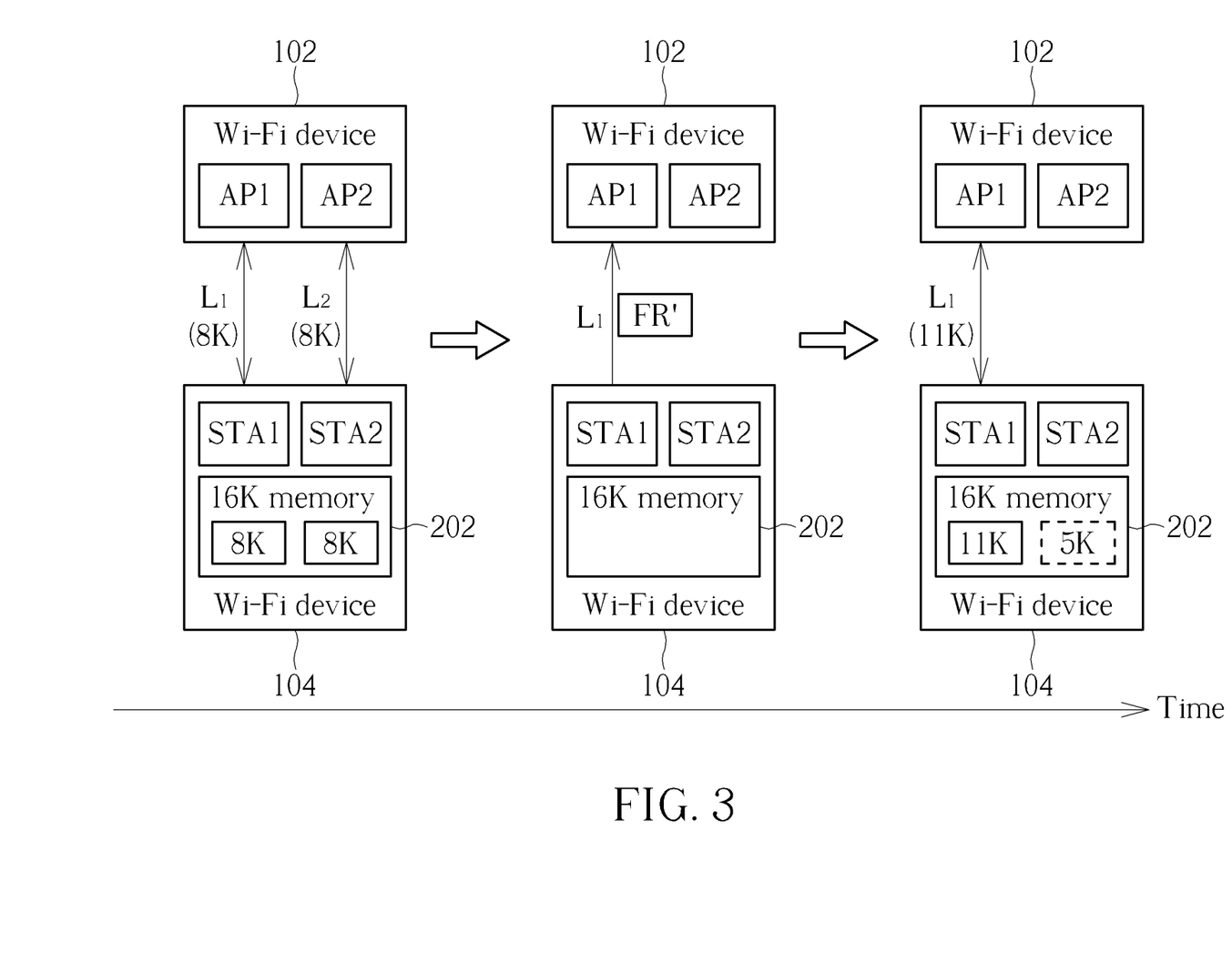
FIG. 3 is a diagram illustrating a second DBDC scenario according to an embodiment of the present invention.

FIG. 3 is a diagram illustrating a second DBDC scenario according to an embodiment of the present invention. Suppose that the Wi-Fi device 102 is an AP DBDC host that has two stations 112_1 and 112_N (N=2) being APs (labeled by AP1 and AP2), the Wi-Fi device 104 is an STA DBDC host that has a 16K memory 202 and two stations 122_1 and 122_N (N=2) being non-AP STAs (labeled by STA1 and STA2), and the links $L_1$ and $L_2$ are at different bands (e.g. 2.4 GHz band and 5 GHz band). Initially, the non-AP station STA1 associates with the access point AP1, and the non-AP station STA2 associates with the access point AP2. To balance the load and maximize the possible throughput, the Wi-Fi device (e.g. STA DBDC host) 104 with the 16K memory 202 may evenly divide the memory resource, and allocate the same capability (e.g. maximum MPDU length=7991 (8K) octets) to both of the non-AP stations STA1 and STA2 during one association between non-AP station STA1 and access point AP1 and another association between non-AP station STA2 and access point AP2.

In this example, de-association between the non-AP station STA2 and the access point AP2 is initiated after the non-AP station STA1 associates with the access point AP1 and the non-AP station STA2 associates with the access point AP2. Hence, in response to the de-association between the non-AP station STA2 and the access point AP2, the non-AP station STA1 sends a frame FR' to the access point AP1 for signaling the capability allocation update of the non-AP station STA1. For example, the frame FR' can be sent after the non-AP station STA2 successfully de-associates with the access point AP2. For another example, the frame FR' can be sent before the non-AP station STA2 initiates the de-association with the access point AP2. The frame FR' sent from the non-AP station STA1 carries information about a different capability allocation (e.g. maximum MPDU length=11454 (11K) octets) used for updating the current capability allocation (e.g. maximum MPDU length=7991 (8K) octets) of the non-AP station STA1. It should be noted that no re-association between the non-AP station STA1 and the access point AP1 is required for changing/updating the current capability allocation of the non-AP station STA1. As shown in FIG. 3, after the non-AP station STA2 de-associates with the access point AP2, the 16K memory 202 is shared by the non-AP station STA1 only. Based on the capability signaled from the Wi-Fi device 104, the access point AP1 may send a packet with an MPDU length constrained by the maximum MPDU length=11454 (11K) octets to the non-AP station STA1 via the link $L_1$.

Figure 4:
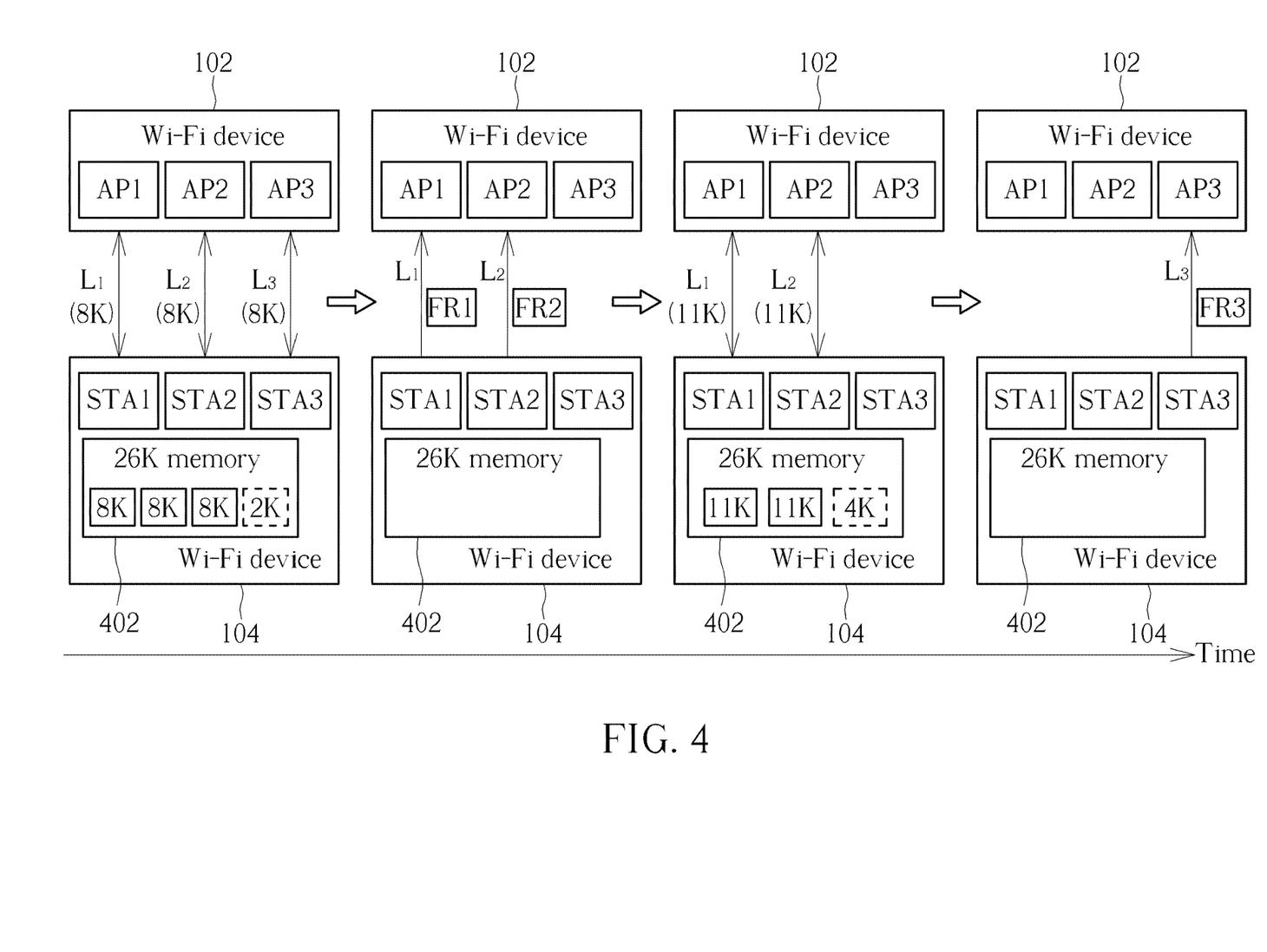
FIG. 4 is a diagram illustrating a first multi-link operation (MLO) scenario according to an embodiment of the present invention.

FIG. 4 is a diagram illustrating a first multi-link operation (MLO) scenario according to an embodiment of the present invention. Suppose that the Wi-Fi device 102 is an AP MLD that has three stations 112_1-112_N (N=3) being APs (labeled by AP1, AP2 and AP3), and the Wi-Fi device 104 is a non-AP MLD that has a 26K memory 402 and three stations 122_1-122_N (N=3) being non-AP STAs (labeled by STA1, STA2 and STA3). Initially, all of the three links $L_1$, $L_2$, and $L_3$ (e.g. links at 2.4 GHz band, 5 GHz band, and 6 GHz band) are enabled. In addition, the capability allocation (e.g. maximum MPDU length) is set up as 7991 (8K) octets for each of the non-AP stations STA1-STA3 during the MLO association between Wi-Fi devices 102 and 104. The 26K memory 402 at the Wi-Fi device (e.g. non-AP MLD) 104 is shared by the non-AP stations STA1-STA3.

In this example, the link $L_3$ is disabled after the MLO association between Wi-Fi devices 102 and 104 is completed. That is, the link $L_3$ is disabled after links $L_1$-$L_3$ are all enabled. Hence, in response to the link $L_3$ being disabled, the non-AP station STA1 sends a frame FR1 to the access point AP1 for signaling the capability allocation update of the non-AP station STA1, and the non-AP station STA2 sends a frame FR2 to the access point AP2 for signaling the capability allocation update of the non-AP station STA2. For example, the frame FR1 sent from the non-AP station STA1 carries information about a different capability allocation (e.g. maximum MPDU length=11454 (11K) octets) used for updating the current capability allocation (e.g. maximum MPDU length=7991 (8K) octets) of non-AP station STA1, and the frame FR2 sent from the non-AP station STA2 carries information about a different capability allocation (e.g. maximum MPDU length=11454 (11K) octets) used for updating the current capability allocation (e.g. maximum MPDU length=7991 (8K) octets) of non-AP station STA2. It should be noted that no re-association between the non-AP station STA1/STA2 and the access point AP1/AP2 (particularly, re-association between an AP MLD and a non-AP MLD) is required for changing/updating the current capability allocation of the non-AP station STA1/STA2.

As shown in FIG. 4, after the link L3 is disabled, the 26K memory 202 is shared by two non-AP stations STA1 and STA2. Based on the capability signaled from the Wi-Fi device 104, the access point AP1 may send a packet with an MPDU length constrained by the maximum MPDU length=11454 (11K) octets to the non-AP station STA1 via the link $L_1$, and the access point AP2 may send a packet with an MPDU length constrained by the maximum MPDU length=11454 (11K) octets to the non-AP station STA2 via the link $L_2$.

It is possible that the link $L_3$ may be enabled again after the link $L_3$ is disabled. In this example, the Wi-Fi device (e.g. non-AP MLD) 104 does not change the memory allocation for non-AP stations STA1 and STA2 when the link $L_3$ is enabled again. Since the size of a free memory space available in the 26K memory 402 is 3895 (4K) octets and the existing capability allocation of non-AP station STA3 (i.e. a capability allocation assigned to non-AP station STA3 before link $L_3$ is disabled) is set up by maximum MPDU length=7991 (8K) octets, the non-AP station STA3 sends a frame FR3 to the access point AP3 for signaling the capability allocation update of the non-AP station STA3, where the frame FR3 carries information about a different capability allocation (e.g. maximum MPDU length=3895 (4K) octets) used for updating the current capability allocation (e.g. maximum MPDU length=7991 (8K) octets) of non-AP station STA3.

Figure 5:
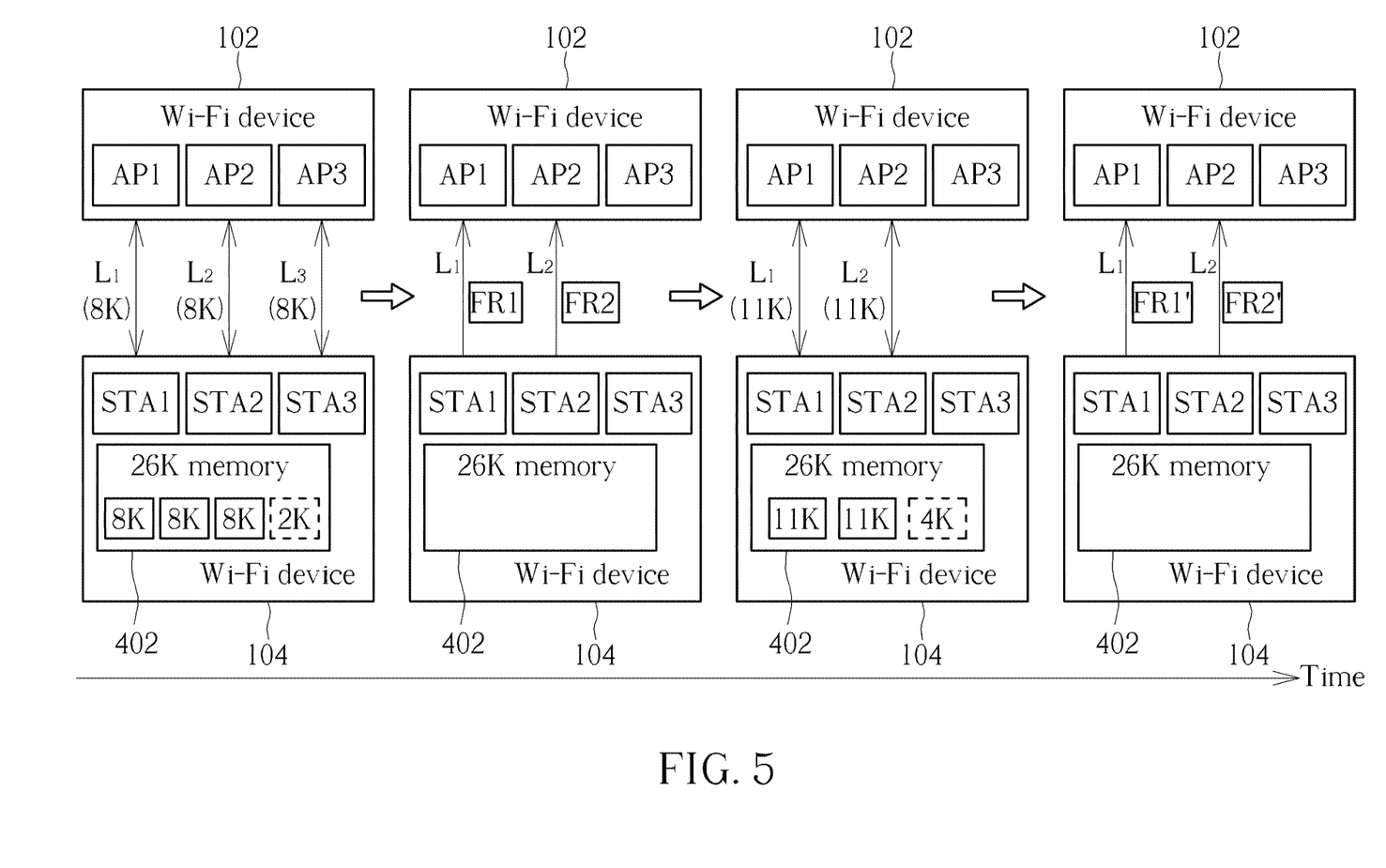
FIG. 5 is a diagram illustrating a variant of the first MLO scenario according to an embodiment of the present invention.

FIG. 5 is a diagram illustrating a variant of the first MLO scenario according to an embodiment of the present invention. The major difference between MLO scenarios shown in FIG. 4 and FIG. 5 is that the Wi-Fi device (e.g. non-AP MLD) 104 in FIG. 5 decides that all non-AP stations STA1-STA3 should share the same capability (e.g. the same maximum MPDU length=7991 (8K) octets) when the link $L_3$ is enabled again. Since the current capability allocation of non-AP station STA1 is set up by maximum MPDU length=11454 (11K) octets, the current capability allocation of non-AP station STA2 is set up by maximum MPDU length=11454 (11K) octets, and the existing capability allocation of non-AP station STA3 (i.e. a capability allocation assigned to non-AP station STA3 before link $L_3$ is disabled) is set up by maximum MPDU length=7991 (8K) octets, the non-AP station STA1 sends a frame FR1' to the access point AP1 for signaling the capability allocation update of non-AP station STA1, and the non-AP station STA2 sends a frame FR2' to the access point AP2 for signaling the capability allocation update of non-AP station STA2, where the frame FR1' carries information about a different capability allocation (e.g. maximum MPDU length=7991 (8K) octets) used for updating the current capability allocation (e.g. maximum MPDU length=11454 (11K) octets) of non-AP station STA1, and the frame FR2' carries information about a different capability allocation (e.g. maximum MPDU length=7991 (8K) octets) used for updating the current capability allocation (e.g. maximum MPDU length=11454 (11K) octets) of non-AP station STA2.

Figure 6:
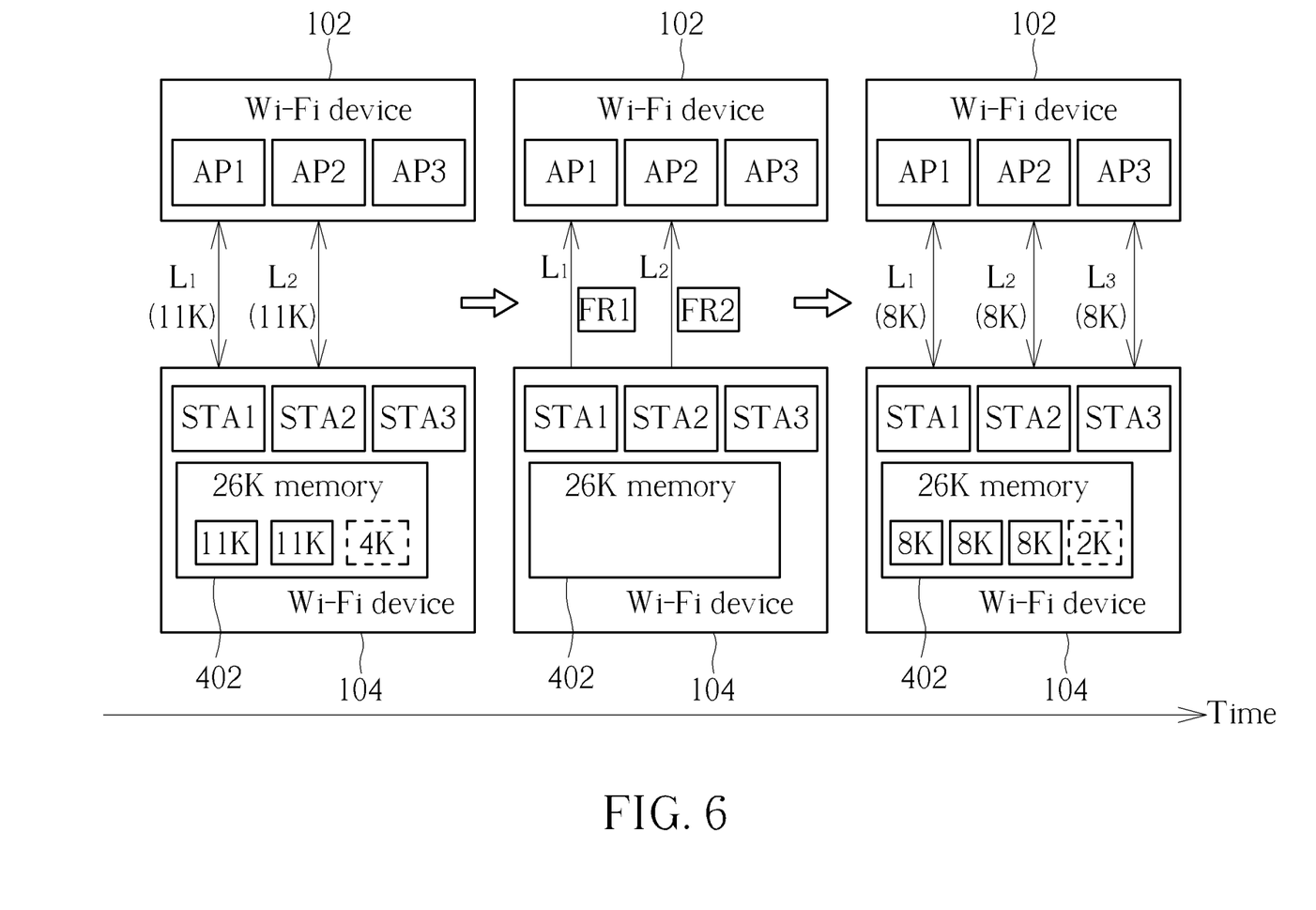
FIG. 6 is a diagram illustrating a second MLO scenario according to an embodiment of the present invention.

FIG. 6 is a diagram illustrating a second MLO scenario according to an embodiment of the present invention. Suppose that the Wi-Fi device 102 is an AP MLD that has three stations 112_1-112_N (N=3) being APs (labeled by AP1, AP2 and AP3), and the Wi-Fi device 104 is a non-AP MLD that has a 26K memory 402 and three stations 122_1-122_N (N=3) being non-AP STAs (labeled by STA1, STA2 and STA3). Initially, only two links $L_1$ and $L_2$ (e.g. links at two of 2.4 GHz band, 5 GHz band, and 6 GHz band) are enabled. Hence, the 26K memory 402 at the Wi-Fi device (e.g. non-AP MLD) 104 is shared by two non-AP stations STA1 and STA2. In addition, the capability allocation (e.g. maximum MPDU length) is set up as 11454 (11K) octets for each of the non-AP stations STA1 and STA2 during the MLO association between the Wi-Fi devices 102 and 104. It should be noted that, although the link $L_3$ is disabled initially, the MLO association between the Wi-Fi devices 102 and 104 may also set up a capability allocation (e.g. maximum MPDU length) for non-AP station STA3. In other words, the non-AP station STA3 can have a designated capability allocation (e.g. maximum MPDU length) before link $L_3$ is disabled.

It is possible that the link $L_3$ may be enabled after the MLO association between Wi-Fi devices 102 and 104 is completed. That is, the link $L_3$ is enabled after links $L_1$ and $L_2$ are enabled. In this embodiment, the Wi-Fi device (e.g. non-AP MLD) 104 decides that all non-AP stations STA1-STA3 share the same capability (e.g. the same maximum MPDU length=7991 (8K) octets) when the link $L_3$ is enabled, and the existing capability allocation of non-AP station STA3 (i.e. a capability allocation assigned to non-AP station STA3 before link $L_3$ is disabled or during the MLO association) is set up by maximum MPDU length=7991 (8K) octets. Hence, in response to the link $L_3$ being enabled, the non-AP station STA1 sends a frame FR1 to the access point AP1 for signaling the capability allocation update of non-AP station STA1, and the non-AP station STA2 sends a frame FR2 to the access point AP2 for signaling the capability allocation update of non-AP station STA2, where the frame FR1 sent from the non-AP station STA1 carries information about a different capability allocation (e.g. maximum MPDU length=7991 (8K) octets) used for updating the current capability allocation (e.g. maximum MPDU length=11454 (11K) octets) of non-AP station STA1, and the frame FR2 sent from the non-AP station STA2 carries information about a different capability allocation (e.g. maximum MPDU length=7991 (8K) octets) used for updating the current capability allocation (e.g. maximum MPDU length=11454 (11K) octets) of non-AP station STA2. It should be noted that no re-association between the non-AP station STA1/STA2 and the access point AP1/AP2 (particularly, re-association between an AP MLD and a non-AP MLD) is required for changing/updating the current capability allocation of the non-AP station STA1/STA2.

As shown in FIG. 6, after the link $L_3$ is enabled, the 26K memory 202 is shared by three non-AP stations STA1-STA3. Based on the capability signaled from the Wi-Fi device 104, the access point AP1 may send a packet with an MPDU length constrained by the maximum MPDU length=7991 (8K) octets to the non-AP station STA1 via the link $L_1$, the access point AP2 may send a packet with an MPDU length constrained by the maximum MPDU length=7991 (8K) octets to the non-AP station STA2 via the link $L_2$, and the access point AP3 may send a packet with an MPDU length constrained by the maximum MPDU length=7991 (8K) octets to the non-AP station STA3 via the link $L_3$.

Figure 7:
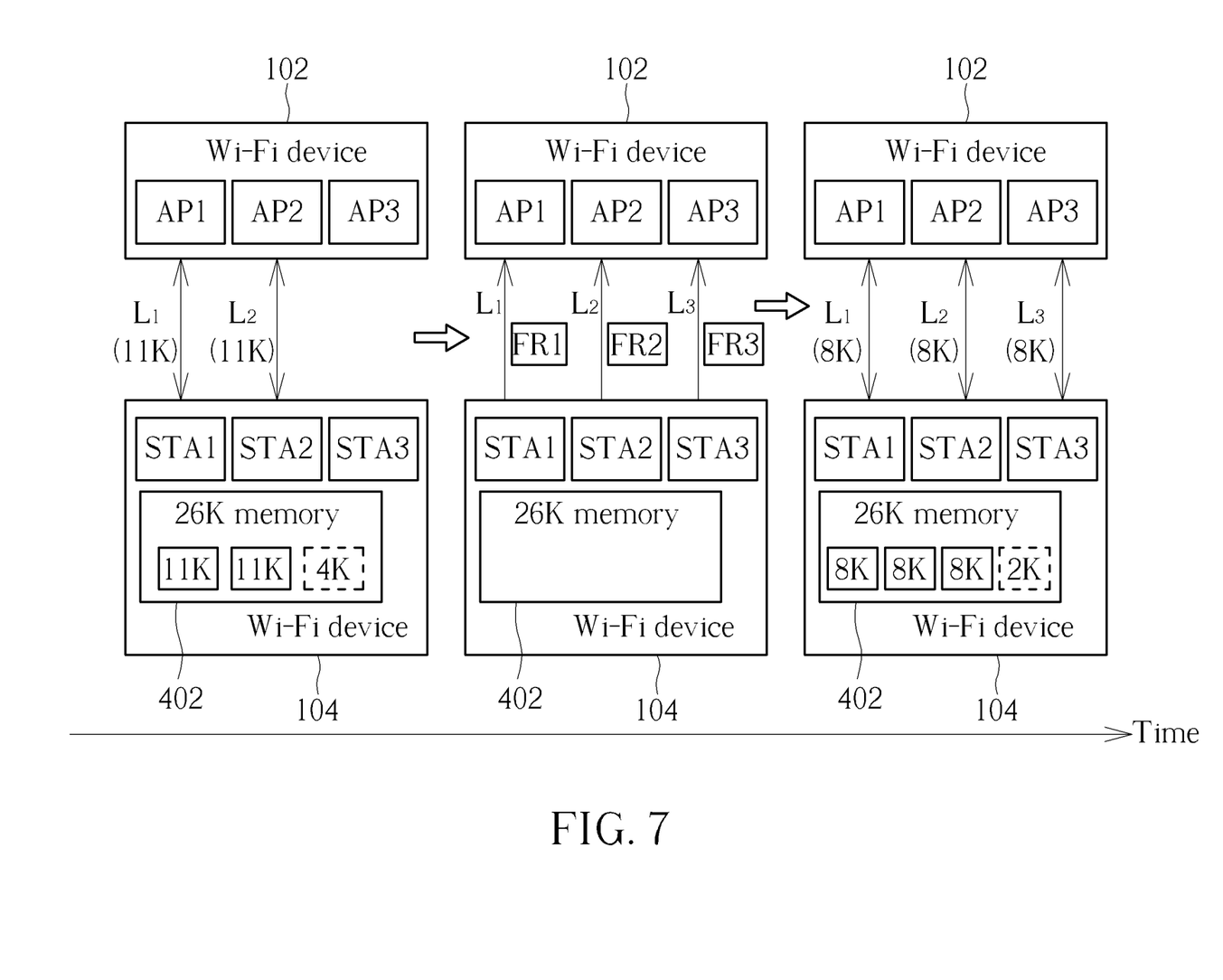
FIG. 7 is a diagram illustrating a variant of the second MLO scenario according to an embodiment of the present invention.

FIG. 7 is a diagram illustrating a variant of the second MLO scenario according to an embodiment of the present invention. The major difference between MLO scenarios shown in FIG. 6 and FIG. 7 is that a capability allocation assigned to non-AP station STA3 before link $L_3$ is disabled or during the MLO association is set up by another maximum MPDU length (e.g. 3895 (4K) octets) different from 7991 (8K) octets. In this example, the Wi-Fi device (e.g. non-AP MLD) 104 decides that all non-AP stations STA1-STA3 share the same capability (e.g. the same maximum MPDU length=7991 (8K) octets) when the link $L_3$ is enabled. Hence, the non-AP station STA1 sends a frame FR1 to the access point AP1 for signaling the capability allocation update of non-AP station STA1, the non-AP station STA2 sends a frame FR2 to the access point AP2 for signaling the capability allocation update of non-AP station STA2, and the non-AP station STA3 sends a frame FR3 to the access point AP3 for signaling the capability allocation update of non-AP station STA3, where the frame FR1 carries information about a different capability allocation (e.g. maximum MPDU length=7991 (8K) octets) used for updating the current capability allocation (e.g. maximum MPDU length=11454 (11K) octets) of non-AP station STA1, the frame FR2 carries information about a different capability allocation (e.g. maximum MPDU length=7991 (8K) octets) used for updating the current capability allocation (e.g. maximum MPDU length=11454 (11K) octets) of non-AP station STA2, and the frame FR3 carries information about a different capability allocation (e.g. maximum MPDU length=7991 (8K) octets) used for updating the current capability allocation (e.g. maximum MPDU length=3895 (4K) octets) of non-AP station STA3.

Figure 8:
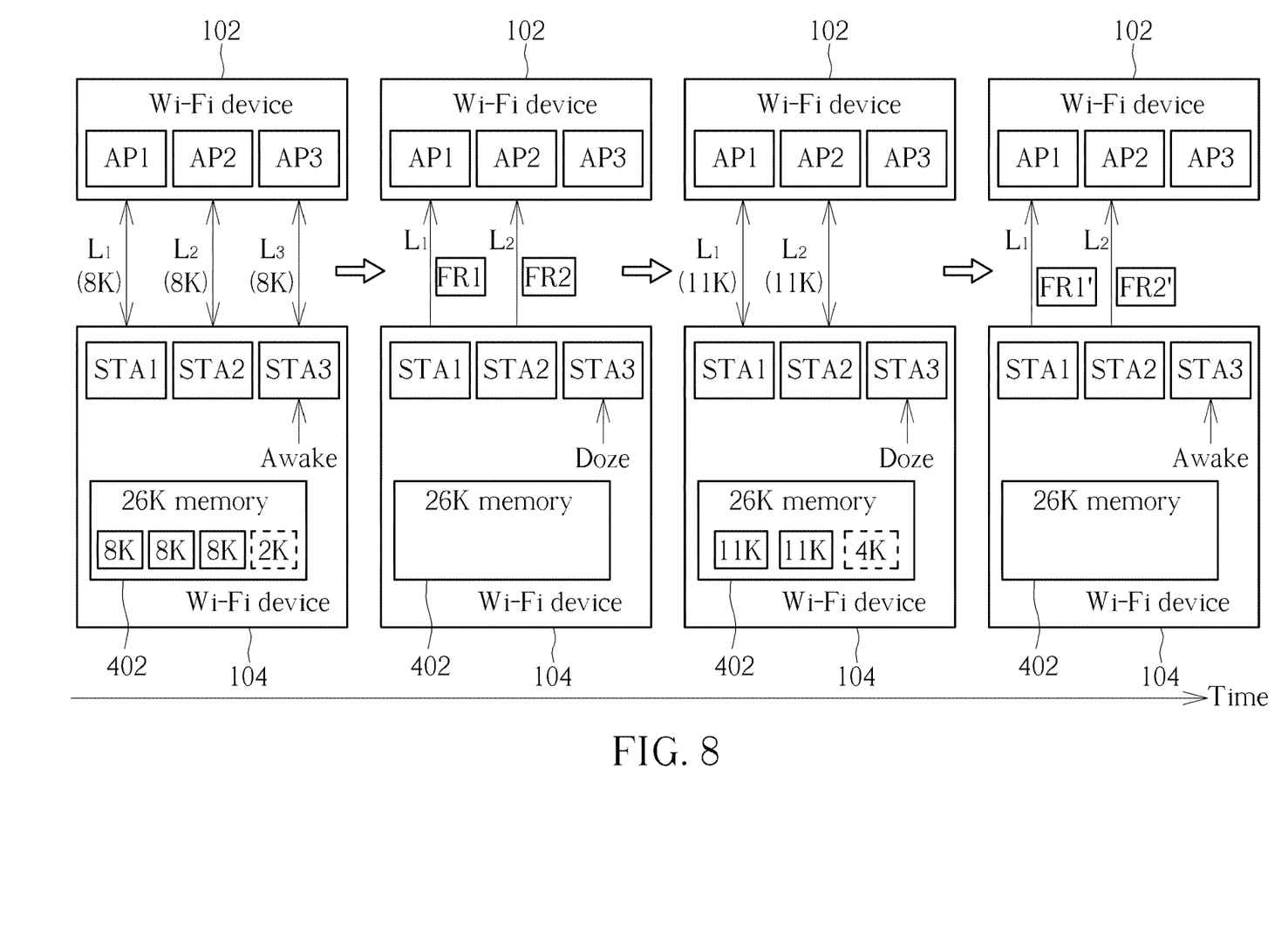
FIG. 8 is a diagram illustrating a third MLO scenario according to an embodiment of the present invention.

FIG. 8 is a diagram illustrating a third MLO scenario according to an embodiment of the present invention. In the aforementioned MLO scenarios, changing a capability allocation of one non-AP station (which is using an enabled link for wireless communications) is performed in response to enabling/disabling another link. Regarding the third MLO scenario, a more aggressive updating method is employed for changing a capability allocation of one non-AP station (which is using an enabled link for wireless communications) in response to a state transition of another enabled link under a power save mode, where the state transition may be a transition from an awake state to a doze state or a transition from a doze state to an awake state. A capability re-allocation operation performed in response to an enabled link entering an awake state in the third MLO scenario is similar to a capability re-allocation operation performed in response to a link being enabled in the first/second MLO scenario, and a capability re-allocation operation performed in response to an enabled link entering a doze state in the third MLO scenario is similar to a capability re-allocation operation performed in response to a link being disabled in the first/second MLO scenario.

Suppose that the Wi-Fi device 102 is an AP MLD that has three stations 112_1-112_N (N=3) being APs (labeled by AP1, AP2 and AP3), and the Wi-Fi device 104 is a non-AP MLD that has a 26K memory 402 and three stations 122_1-122_N (N=3) being non-AP STAs (labeled by STA1, STA2 and STA3). Initially, all of the three links $L_1$, $L_2$, and $L_3$ (e.g. links at 2.4 GHz band, 5 GHz band, and 6 GHz band) are enabled. In addition, the capability allocation (e.g. the maximum MPDU length) is setup as 7991 (8K) octets for each of the non-AP stations STA1-STA3 during the MLO association between the Wi-Fi devices 102 and 104. Hence, the 26K memory 402 is shared by the non-AP stations STA1-STA3.

In this example, the non-AP station STA3 operates under a power save mode. Initially, the non-AP station STA3 enters an awake state to receive or transmit frames. When the non-AP station STA3 leaves the awake state and enters the doze state under the power save mode, the Wi-Fi device (e.g. non-AP MLD) 104 initiates capability re-allocation for other non-AP stations STA1 and STA2. Hence, in response to the enabled link $L_3$ being switched from the awake state to the doze state, the non-AP station STA1 sends a frame FR1 to the access point AP1 for signaling the capability allocation update of non-AP station STA1, and the non-AP station STA2 sends a frame FR2 to the access point AP2 for signaling the capability allocation update of non-AP station STA2. For example, the frame FR1 sent from the non-AP station STA1 carries information about a different capability allocation (e.g. maximum MPDU length=11454 (11K) octets) used for updating the current capability allocation (e.g. maximum MPDU length=7991 (8K) octets) of non-AP station STA1, and the frame FR2 sent from the non-AP station STA2 carries information about a different capability allocation (e.g. maximum MPDU length=11454 (11K) octets) used for updating the current capability allocation (e.g. maximum MPDU length=7991 (8K) octets) of non-AP station STA2. It should be noted that no re-association between the non-AP station STA1/STA2 and the access point AP1/AP2 (particularly, re-association between an AP MLD and a non-AP MLD) is required for changing/updating the current capability allocation of the non-AP station STA1/STA2.

As shown in FIG. 8, after the non-AP station STA3 enters the doze state, the 26K memory 402 is shared by two non-AP stations STA1 and STA2. Based on the capability signaled from the Wi-Fi device 104, the access point AP1 may send a packet with an MPDU length constrained by the maximum MPDU length=11454 (11K) octets to the non-AP station STA1 via the link $L_1$, and the access point AP2 may send a packet with an MPDU length constrained by the maximum MPDU length=11454 (11K) octets to the non-AP station STA2 via the link $L_2$.

One non-AP station operating under the power save mode may switch between the awake state and the doze state frequently. In this example, when the non-AP station STA3 leaves the awake state and enters the awake state again under the power save mode, the Wi-Fi device (e.g. non-AP MLD) 104 initiates another capability re-allocation for other non-AP stations STA1 and STA2. Hence, in response to the enabled link $L_3$ being switched from the doze state to the awake state, the non-AP station STA1 sends a frame FR1' to the access point AP1 for signaling the capability allocation update of non-AP station STA1, and the non-AP station STA2 sends a frame FR2' to the access point AP2 for signaling the capability allocation update of non-AP station STA2. For example, the frame FR1' sent from the non-AP station STA1 carries information about a different capability allocation (e.g. maximum MPDU length=7991 (8K) octets) used for updating the current capability allocation (e.g. maximum MPDU length=11454 (11K) octets) of non-AP station STA1, and the frame FR2' sent from the non-AP station STA2 carries information about a different capability allocation (e.g. maximum MPDU length=7991 (8K) octets) used for updating the current capability allocation (e.g. maximum MPDU length=11454 (11K) octets) of non-AP station STA2. It should be noted that no re-association between the non-AP station STA1/STA2 and the access point AP1/AP2 (particularly, re-association between an AP MLD and a non-AP MLD) is required for changing/updating the current capability allocation of the non-AP station STA1/STA2.

Figure 9:
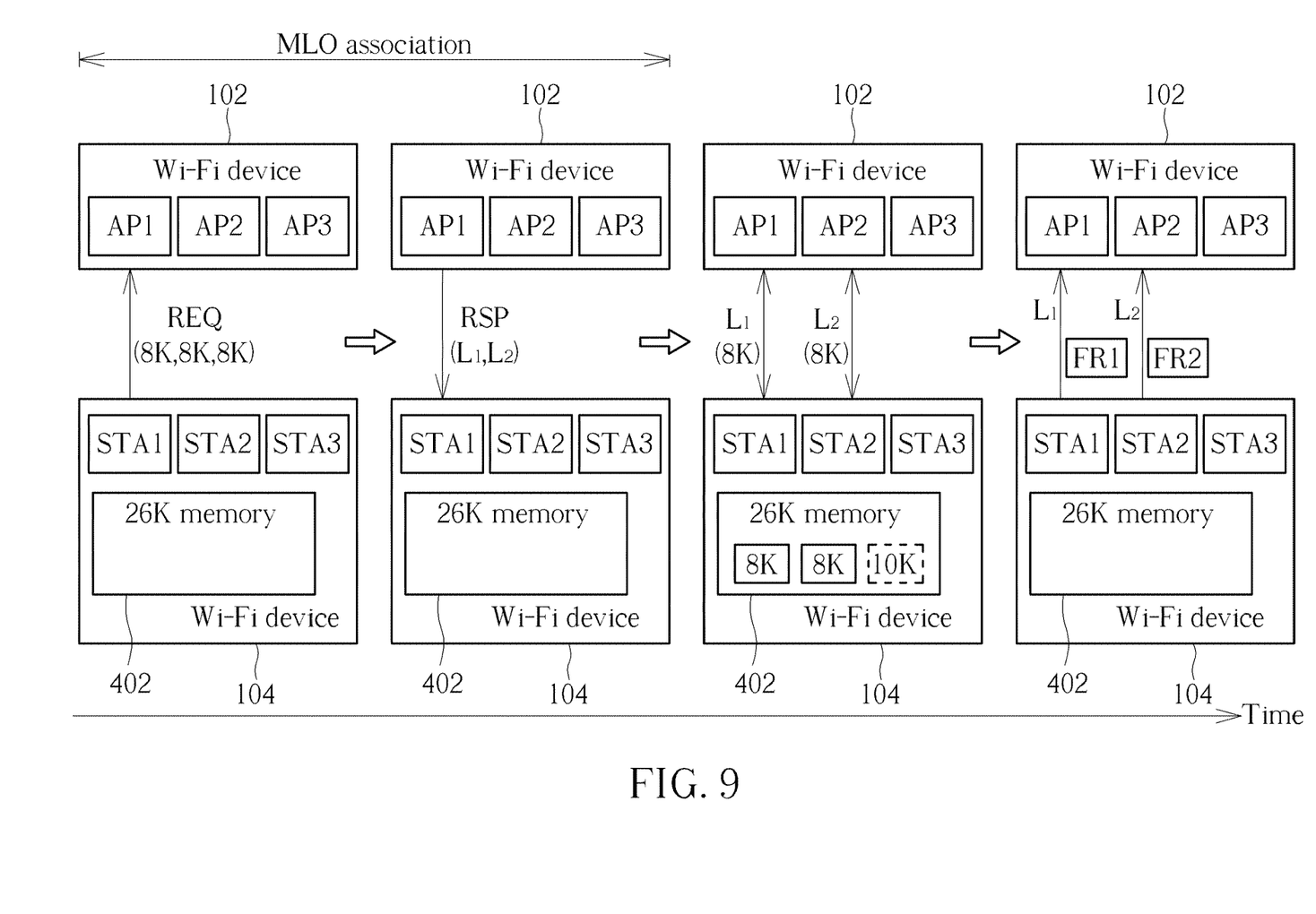
FIG. 9 is a diagram illustrating a fourth MLO scenario according to an embodiment of the present invention.

FIG. 9 is a diagram illustrating a fourth MLO scenario according to an embodiment of the present invention. Suppose that the Wi-Fi device 102 is an AP MLD that has three stations 112_1-112_N (N=3) being APs (labeled by AP1, AP2 and AP3), and the Wi-Fi device 104 is a non-AP MLD that has a 26K memory 402 and three stations 122_1-122_N (N=3) being non-AP STAs (labeled by STA1, STA2 and STA3). During the MLO association between the Wi-Fi devices 102 and 104, the Wi-Fi device (e.g. non-AP MLD) 104 sends an association request REQ for setting up three links and the corresponding capability allocations (e.g., maximum MPDU lengths=(8K, 8K, 8K) of non-AP stations STA1-STA3). However, the Wi-Fi device (e.g. AP MLD) 102 allows only a subset of the requested links, and informs the Wi-Fi device (e.g. non-AP MLD) 104 of two allowed links (e.g. $L_1$ and $L_2$) and one denied link (e.g. $L_3$) by a response frame RSP. In other words, the request of setting up links $L_1$ and $L_2$ is allowed by the Wi-Fi device (e.g. AP MLD) 102, and the request of setting up the link $L_3$ is denied by the Wi-Fi device (e.g. AP MLD) 102.

After the MLO association between Wi-Fi devices 102 and 104 is completed, only two links $L_1$ and $L_2$ (e.g. links at two of 2.4 GHz band, 5 GHz band, and 6 GHz band) are enabled. The capability allocation (e.g. maximum MPDU length) is set up as 7991 (8K) octets for each of the non-AP stations STA1 and STA2. In addition, the 26K memory 402 at the Wi-Fi device (e.g. non-AP MLD) 104 is shared by the non-AP stations STA1 and STA2.

The Wi-Fi device (e.g. non-AP MLD) 104 can re-allocate resources originally defined for three non-AP stations, to enhance the efficiency or the throughput of two links actually allowed by the Wi-Fi device (e.g. AP MLD) 102. Hence, in response to a request of setting up the link $L_3$ being denied by the Wi-Fi device (e.g. AP MLD) 102, the non-AP station STA1 sends a frame FR1 to the access point AP1 for signaling the capability allocation update of non-AP station STA1, and the non-AP station STA2 sends a frame FR2 to the access point AP2 for signaling the capability allocation update of non-AP station STA2. For example, the frame FR1 sent from the non-AP station STA1 carries information about a different capability allocation (e.g. maximum MPDU length=11454 (11K) octets) used for updating the current capability allocation (e.g. maximum MPDU length=7991 (8K) octets) of non-AP station STA1, and the frame FR2 sent from the non-AP station STA2 carries information about a different capability allocation (e.g. maximum MPDU length=11454 (11K) octets) used for updating the current capability allocation (e.g. maximum MPDU length=7991 (8K) octets) of non-AP station STA2. It should be noted that no re-association between the non-AP station STA1/STA2 and the access point AP1/AP2 (particularly, re-association between an AP MLD and a non-AP MLD) is required for changing/updating the current capability allocation of the non-AP station STA1/STA2.

In above examples, changing a capability allocation of a specific non-AP station requires sending a frame to carry information indicative of the capability allocation update of the specific link. If a Wi-Fi device is capable of receiving cross-link signaling which enables receiving signaling from one link and applying the signaling on another link, the number of frames sent for dynamic capability allocation can be reduced. For example, the aforementioned MLO scenarios may be modified to support a cross-link signaling feature, such that one frame sent on one link by one non-AP station can indicate the capability update on other non-AP station(s).

Figure 10:
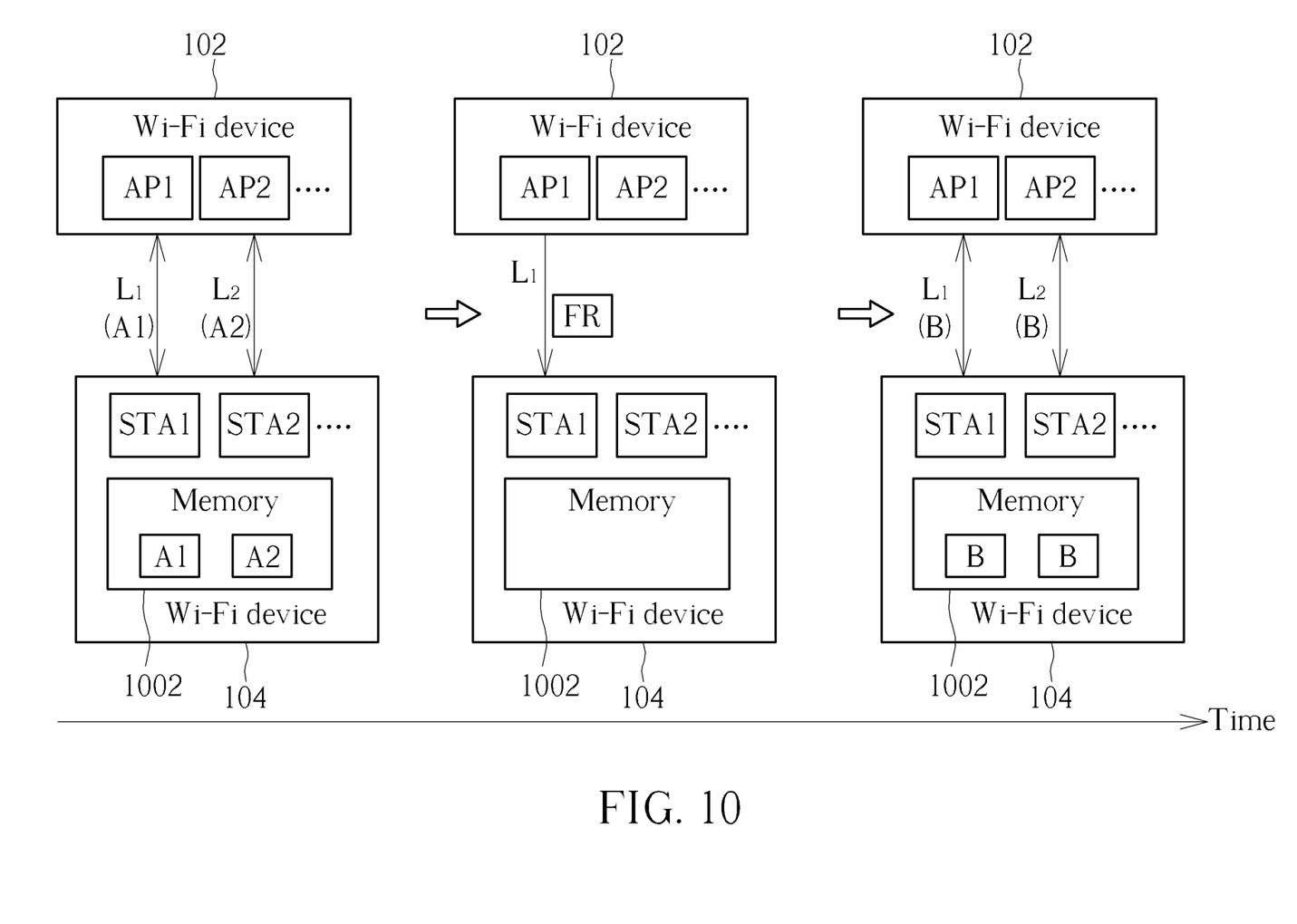
FIG. 10 is a diagram illustrating an MLO scenario with cross-link signaling according to an embodiment of the present invention.

FIG. 10 is a diagram illustrating an MLO scenario with cross-link signaling according to an embodiment of the present invention. Suppose that the Wi-Fi device 102 is an AP MLD, and the Wi-Fi device 104 is a non-AP MLD, where the stations 112_1-112_N include APs (labeled by AP1 and AP2), and the stations 122_1-122_N include non-AP STAs (labeled by STA1 and STA2). Initially, the non-AP station STA1 communicates with the access point AP1 via an enabled link $L_1$, where the non-AP station STA1 is assigned with a capability allocation (e.g. maximum MPDU length=A1 octets) that is set up during the MLO association between Wi-Fi devices 102 and 104, and the non-AP station STA2 communicates with the access point AP2 via an enabled link $L_2$, where the non-AP station STA2 is assigned with a capability allocation (e.g. maximum MPDU length=A2 octets, where A1 may be equal to or different from A2) that is set up during the same MLO association between Wi-Fi devices 102 and 104. Hence, the memory 1002 at the Wi-Fi device (e.g. non-AP MLD) 104 is shared by two non-AP stations STA1 and STA2.

Due to certain factors, the Wi-Fi device (e.g. non-AP MLD) 104 may need to re-allocate the resources for the non-AP stations STA1 and STA2. In this example, the non-AP station STA1 sends a frame FR to the access point AP1, where the frame FR sent from the non-AP station STA1 via link $L_1$ carries information about a different capability allocation (e.g. maximum MPDU length=B octets) used for updating the current capability allocation (e.g. maximum MPDU length=A1 octets) of non-AP station STA1, and the same information carried by the frame FR sent from the non-AP station STA1 via link $L_1$ is further used to indicate a capability allocation update (e.g. maximum MPDU length=B octets) for the current capability allocation (e.g. maximum MPDU length=A2 octets) of non-AP station STA2 that is using another link $L_2$ for wireless communications. It should be noted that no re-association between the non-AP station STA1/STA2 and the access point AP1/AP2 (particularly, re-association between an AP MLD and a non-AP MLD) is required for changing/updating the current capability allocation of the non-AP station STA1/STA2.

In above examples, the memory resource allocation signaled from one Wi-Fi device 102/104 to another Wi-Fi device 104/102 may include a maximum MPDU length. However, this is for illustrative purposes only, and is not meant to be a limitation of the present invention.

In some embodiments of the present invention, the memory resource allocation signaled from one Wi-Fi device 102/104 to another Wi-Fi device 104/102 may include a maximum aggregate MPDU (A-MPDU) length. The maximum A-MPDU length in the high throughput (HT) capabilities element defines 2 possible values. Specifically, a value of a 1-bit maximum A-MPDU length subfield is set to 0 for 3839 octets, and set to 1 for 7935 octets.

In some embodiments of the present invention, the memory resource allocation signaled from one Wi-Fi device 102/104 to another Wi-Fi device 104/102 may include a maximum A-MPDU length exponent. The maximum A-MPDU length exponent in VHT/HE 6G capabilities element defines the maximum length of an A-MPDU to be $2^{(13+Maximum\ A-MPDU\ Length\ Exponent)}-1$ octets.

The capability allocations of non-AP stations can be dynamically changed without re-association between Wi-Fi devices 102 and 104. In addition to the memory resource allocation, the capability allocations may be set by other capabilities or operation modes. For example, one capability allocation for a non-AP station may include the number of spatial streams (NSS) under a receive (RX) mode. For another example, the capability allocation for a non-AP station may include the number of spatial streams (NSS) under a transmit (TX) mode.

As mentioned above, changing a capability allocation of a specific station in a Wi-Fi device requires sending a frame to carry information needed to inform a peer Wi-Fi device of a capability allocation update for a current capability allocation of the specific station. In some embodiments of the present invention, the information may be recorded in an aggregated control (A-Control) field defined in 802.11ax, where a new operating mode (OM) control definition may be added for MLO. In some embodiments of the present invention, the frame may be a management frame that carries the information by using a new capability element. For example, the management frame may be a control frame.

Changing a capability allocation of a non-AP station may be achieved through a one-way notice from one Wi-Fi device 102/104 to another Wi-Fi device 104/102, or may be achieved through a two-way negotiation between one Wi-Fi device 102/104 and another Wi-Fi device 104/102. Regarding the one-way notice for updating the capability allocation, there is no other frames or information corresponding to the frame (which carries information about a different capability allocation), except an acknowledgement (ACK) frame. The capability update will happen immediately on a peer device after the ACK frame is sent by the peer device and received by the requester (e.g. AP or non-AP STA) that sends the frame (which carries information about a different capability allocation). For example, when the information for updating the capability allocation is recorded in an A-Control field, changing a capability allocation may be achieved through the one-way notice.

Regarding the two-way negotiation for updating the capability allocation, the frame (which carries information about a different capability allocation) is a request frame sent from a requester (e.g. non-AP STA), and a peer device (e.g. AP) receives the request frame containing the capability update. The peer device (e.g. AP) needs some time to synchronize the capability update to other APs affiliated to the same AP MLD. The peer device (e.g. AP) sends a response frame corresponding to the request frame to announce that the information synchronization is finished. Hence, the requester (e.g. non-AP STA) can do the capability update after receiving the response frame from the peer device (e.g. AP). For example, when the frame is a management frame, changing a capability allocation of a non-AP station may be achieved through the one-way notice or the two-way negotiation, depending upon actual design considerations. One use case for the one-way notice employed for changing a capability allocation is that the management frame is a broadcast frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capability allocation method employed by a Wi-Fi device, comprising:
   during association between the Wi-Fi device and another Wi-Fi device, setting up a first capability allocation of a first non-AP station (STA), wherein each of the Wi-Fi device and said another Wi-Fi device comprises a plurality of stations, each station affiliated to said another Wi-Fi device is an access point (AP), each station affiliated to the Wi-Fi device is a non-AP STA, a first AP is affiliated to said another Wi-Fi device, and the first non-AP STA is affiliated to the Wi-Fi device; and
   after the first non-AP STA associates with the first AP, changing the first capability allocation of the first non-AP STA in the absence of re-association;
   wherein changing the first capability allocation of the first non-AP STA is achieved through a one-way notice from the Wi-Fi device to said another Wi-Fi device or through a two-way negotiation between the Wi-Fi device and said another Wi-Fi device.

2. The capability allocation method of claim 1, wherein the Wi-Fi device is a dual band dual concurrent (DBDC) host or a triple band triple concurrent (TBTC) host; and the association between the Wi-Fi device and said another Wi-Fi device includes one individual association between the first non-AP STA and the first AP.

3. The capability allocation method of claim 2, wherein a second AP is affiliated to said another Wi-Fi device, a second non-AP STA is affiliated to the Wi-Fi device, association between the second non-AP STA and the second AP is initiated after the first non-AP STA associates with the first AP, and changing the first capability allocation of the first non-AP STA comprises:
   in response to the association between the second non-AP STA and the second AP, sending a frame that carries information about a different capability allocation used for updating the first capability allocation of the first non-AP STA.

4. The capability allocation method of claim 2, wherein a second AP is affiliated to said another Wi-Fi device, a second non-AP STA is affiliated to the Wi-Fi device, de-association between the second non-AP STA and the second AP is initiated after the first non-AP STA associates with the first AP, and changing the first capability allocation of the first non-AP STA comprises:
   in response to the de-association between the second non-AP STA and the second AP, sending a frame that carries information about a different capability allocation used for updating the first capability allocation of the first non-AP STA.

5. The capability allocation method of claim 1, wherein the Wi-Fi device is a multi-link device (MLD), and the association between the Wi-Fi device and said another Wi-Fi device is multi-link operation (MLO) association.

6. A capability allocation method employed by a Wi-Fi device, comprising:
   during association between the Wi-Fi device and another Wi-Fi device, setting up a first capability allocation of a first non-AP station (STA), wherein each of the Wi-Fi device and said another Wi-Fi device comprises a plurality of stations, each station affiliated to said another Wi-Fi device is an access point (AP), each station affiliated to the Wi-Fi device is a non-AP STA, a first AP is affiliated to said another Wi-Fi device, and the first non-AP STA is affiliated to the Wi-Fi device;
   after the first non-AP STA associates with the first AP, changing the first capability allocation of the first non-AP STA in the absence of re-association; and
   during the association between the Wi-Fi device and said another Wi-Fi device, setting up a second capability allocation of a second non-AP STA, wherein a second AP is affiliated to said another Wi-Fi device, and the second non-AP STA is affiliated to the Wi-Fi device;
   wherein the Wi-Fi device is a multi-link device (MLD), and the association between the Wi-Fi device and said another Wi-Fi device is multi-link operation (MLO) association; a first link between the first non-AP STA and the first AP and a second link between the second non-AP STA and the second AP are enabled links before changing the first capability allocation of the first non-AP STA is performed;
   and changing the first capability allocation of the first non-AP STA comprises:
   in response to the second link being disabled, sending a frame that carries information about a third capability allocation used for updating the first capability allocation of the first non-AP STA, wherein the third capability allocation is different from the first capability allocation.

7. The capability allocation method of claim 6, further comprising:

in response to the second link being enabled again after the second link is disabled, keeping the third capability allocation of the first non-AP STA unchanged.

8. The capability allocation method of claim 6, further comprising:
in response to the second link being enabled again after the second link is disabled, sending a frame that carries information about a different capability allocation used for updating the third capability allocation of the first non-AP STA.

9. A capability allocation method employed by a Wi-Fi device, comprising:
during association between the Wi-Fi device and another Wi-Fi device, setting up a first capability allocation of a first non-AP station (STA), wherein each of the Wi-Fi device and said another Wi-Fi device comprises a plurality of stations, each station affiliated to said another Wi-Fi device is an access point (AP), each station affiliated to the Wi-Fi device is a non-AP STA, a first AP is affiliated to said another Wi-Fi device, and the first non-AP STA is affiliated to the Wi-Fi device;
after the first non-AP STA associates with the first AP, changing the first capability allocation of the first non-AP STA in the absence of re-association; and
during the association between the Wi-Fi device and said another Wi-Fi device, setting up a second capability allocation of a second non-AP STA, wherein a second AP is affiliated to said another Wi-Fi device, and the second non-AP STA is affiliated to the Wi-Fi device;
wherein the Wi-Fi device is a multi-link device (MLD), and the association between the Wi-Fi device and said another Wi-Fi device is multi-link operation (MLO) association; a first link between the first non-AP STA and the first AP is an enabled link and a second link between the second non-AP STA and the second AP is a disabled link before changing the first capability allocation of the first non-AP STA is performed; and changing the first capability allocation of the first non-AP STA comprises:
in response to the second link being enabled, sending a frame that carries information about a third capability allocation used for updating the first capability allocation of the first non-AP STA, wherein the third capability allocation is different from the first capability allocation.

10. The capability allocation method of claim 9, further comprising:
in response to the second link being enabled, sending another frame that carries information about a fourth capability allocation used for updating the second capability allocation of the second non-AP STA;
wherein the fourth capability allocation is different from the second capability allocation.

11. The capability allocation method of claim 5, further comprising:
during the association between the Wi-Fi device and said another Wi-Fi device, setting up a second capability allocation of a second non-AP STA, wherein a second AP is affiliated to said another Wi-Fi device, and the second non-AP STA is affiliated to the Wi-Fi device;
wherein a first link between the first non-AP STA and the first AP and a second link between the second non-AP STA and the second AP are enabled links; the second non-AP STA operates under a power save mode; and changing the first capability allocation of the first non-AP STA comprises:
in response to the second non-AP STA being switched from one of an awake state and a doze state to another of the awake state and the doze state, sending a frame that carries information about a different capability allocation used for updating the first capability allocation of the first non-AP STA.

12. The capability allocation method of claim 5, further comprising:
during the association between the Wi-Fi device and said another Wi-Fi device, setting up a second capability allocation of a second non-AP STA, wherein a second AP is affiliated to said another Wi-Fi device, and the second non-AP STA is affiliated to the Wi-Fi device;
wherein during the association between the Wi-Fi device and said another Wi-Fi device, a request of setting up a first link between the first non-AP STA and the first AP is allowed by said another Wi-Fi device and a request of setting up a second link between the second non-AP STA and the second AP is denied by said another Wi-Fi device; and changing the first capability allocation of the first non-AP STA comprises:
in response to the request of setting up the second link being denied by said another Wi-Fi device, sending a frame that carries information about a different capability allocation used for updating the first capability allocation of the first non-AP STA.

13. The capability allocation method of claim 1, wherein a second non-AP STA is affiliated to the Wi-Fi device, and changing the first capability allocation of the first non-AP STA comprises:
sending a frame that carries information about a different capability allocation used for updating the first capability allocation of the first non-AP STA, wherein the same information carried by the frame also indicates a capability allocation update for a second capability allocation of the second non-AP STA.

14. The capability allocation method of claim 1, wherein the first capability allocation comprises a memory resource allocation.

15. The capability allocation method of claim 14, wherein the memory resource allocation comprises a maximum media access control (MAC) protocol data unit (MPDU) length, a maximum aggregate MPDU (A-MPDU) length, or a maximum A-MPDU length exponent.

16. The capability allocation method of claim 1, wherein the first capability allocation comprises a number of spatial streams (NSS) under a receive (RX) mode.

17. The capability allocation method of claim 1, wherein the first capability allocation comprises a number of spatial streams (NSS) under a transmit (TX) mode.

18. The capability allocation method of claim 1, wherein changing the first capability allocation of the first non-AP STA comprises:
sending a frame that carries information about a different capability allocation used for updating the first capability allocation of the first non-AP STA, wherein the information is recorded in an aggregated control (A-Control) field, or the frame is a management frame.

* * * * *